United States Patent
Peled et al.

(10) Patent No.: US 10,839,084 B2
(45) Date of Patent: Nov. 17, 2020

(54) CONTEXTUAL RISK MONITORING

(71) Applicant: FORESCOUT TECHNOLOGIES, INC., San Jose, CA (US)

(72) Inventors: Tal Peled, Tel Aviv (IL); Shlomit Tassa, Tel Aviv (IL); Oren Nechushtan, Tel Aviv (IL); Ariel Biton, Tzur Moshe (IL)

(73) Assignee: FORESCOUT TECHNOLOGIES, INC., San Jose, CA (US)

( * ) Notice: Subject to any disclaimer, the term of this patent is extended or adjusted under 35 U.S.C. 154(b) by 161 days.

(21) Appl. No.: 15/841,956

(22) Filed: Dec. 14, 2017

(65) Prior Publication Data
US 2019/0188389 A1 Jun. 20, 2019

(51) Int. Cl.
| | | |
|---|---|---|
| G06F 21/57 | (2013.01) | |
| H04L 29/06 | (2006.01) | |
| G06F 3/147 | (2006.01) | |
| G06F 21/55 | (2013.01) | |

(52) U.S. Cl.
CPC ............ G06F 21/577 (2013.01); G06F 3/147 (2013.01); G06F 21/552 (2013.01); H04L 63/105 (2013.01); H04L 63/1408 (2013.01); H04L 63/1433 (2013.01); H04L 63/20 (2013.01)

(58) Field of Classification Search
CPC ...... G06F 21/577; G06F 3/147; G06F 21/552; H04L 63/1433; H04L 63/105; H04L 63/20; H04L 63/1408
See application file for complete search history.

(56) References Cited

U.S. PATENT DOCUMENTS

| | | | | |
|---|---|---|---|---|
| 9,686,302 | B2 * | 6/2017 | Lapidous | H04L 63/0272 |
| 9,900,162 | B2 * | 2/2018 | Woxland | H04L 9/3271 |
| 10,389,537 | B2 * | 8/2019 | Woxland | H04W 12/0806 |
| 10,460,103 | B2 * | 10/2019 | Bender | G06F 21/554 |
| 10,528,728 | B2 * | 1/2020 | Bender | H04L 63/1441 |
| 10,542,029 | B2 * | 1/2020 | Lapidous | H04L 63/0272 |
| 2003/0182421 | A1 * | 9/2003 | Faybishenko | H04L 63/08 709/224 |
| 2007/0094711 | A1 * | 4/2007 | Corley | G06F 21/53 726/3 |
| 2010/0262706 | A1 * | 10/2010 | Rodriguez | H04L 63/105 709/229 |
| 2011/0034193 | A1 * | 2/2011 | Park | H04B 17/309 455/509 |
| 2013/0169334 | A1 * | 7/2013 | Zhang | H03K 5/135 327/243 |

(Continued)

FOREIGN PATENT DOCUMENTS

WO 2007045554 A2 4/2007

OTHER PUBLICATIONS

Int'l Search Report and Written Opinion of the ISA/EP in PCT/US2018/055609 dated Dec. 19, 2018; 10 pgs.

*Primary Examiner* — Abu S Sholeman
(74) *Attorney, Agent, or Firm* — Womble Bond Dickinson (US) LLP

(57) ABSTRACT

Systems, methods, and related technologies for device monitoring and device risk monitoring are described. In certain aspects, an indicator associated with a security risk is set based on communication between a first device having an associated elevated security risk and a second device. The indicator can be stored and may be used as a basis for performing a security action.

18 Claims, 6 Drawing Sheets

(56) References Cited

U.S. PATENT DOCUMENTS

| | | | |
|---|---|---|---|
| 2015/0188940 A1* | 7/2015 | Lapidous | H04L 63/1433 |
| | | | 726/15 |
| 2016/0173446 A1* | 6/2016 | Nantel | H04L 63/0209 |
| | | | 726/11 |
| 2016/0352729 A1 | 12/2016 | Malik | |
| 2018/0324198 A1* | 11/2018 | Borthakur | H04L 63/1425 |
| 2020/0082108 A1* | 3/2020 | Griffin | G06F 21/6218 |

* cited by examiner

CONTEXTUAL RISK MONITORING

TECHNICAL FIELD

Aspects and implementations of the present disclosure relate to device monitoring, and more specifically, to monitoring risk of devices communicatively coupled via a communication network.

BACKGROUND

As technology advances, the number and variety of devices that are connected to communications networks are rapidly increasing. Each device may have its own respective vulnerabilities which may leave the network open to compromise or other risks. Understanding the vulnerabilities on each device on a network can be useful for monitoring or securing the communication network in order to prevent unauthorized or rogue devices from accessing network resources.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
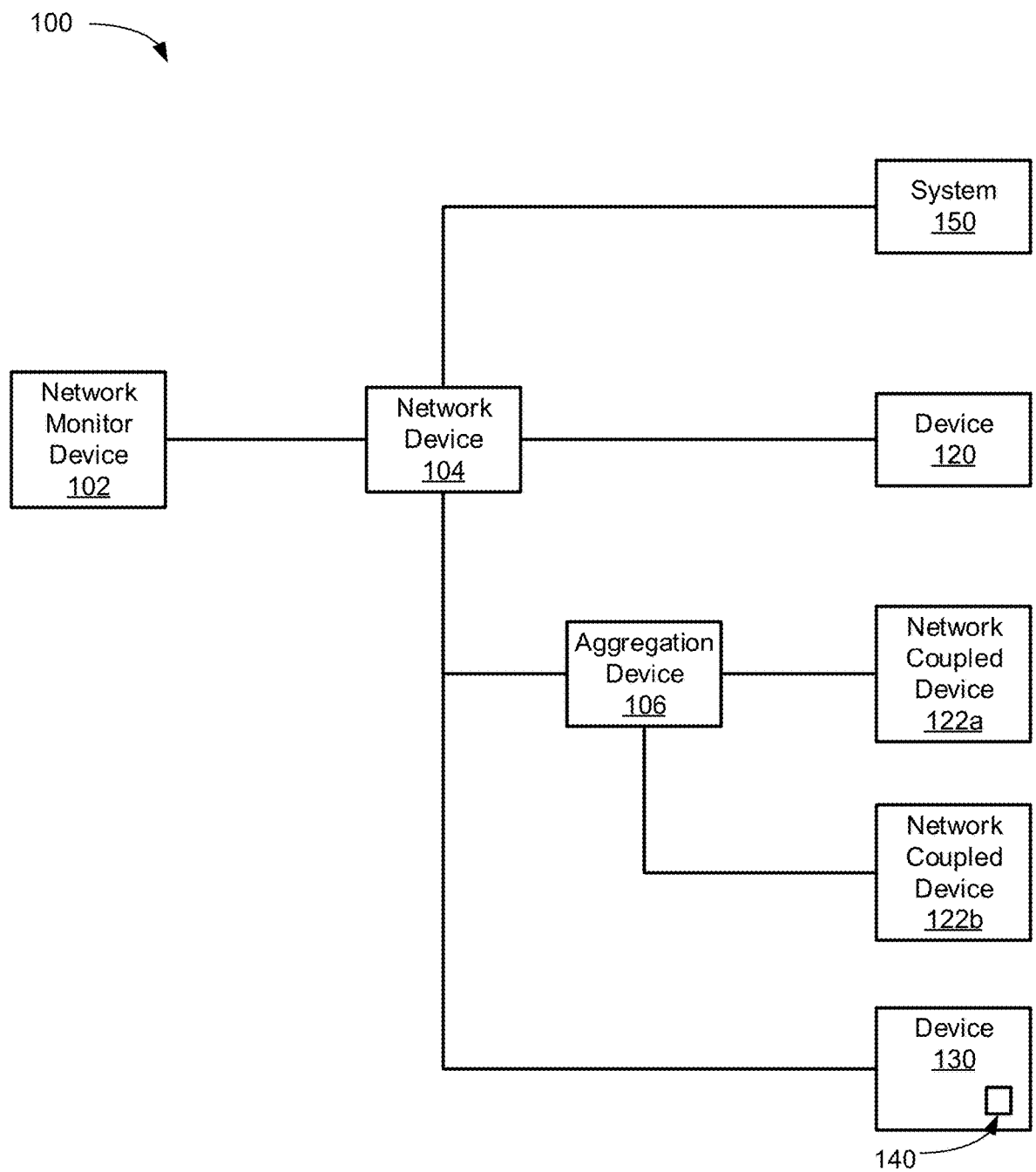
FIG. 1 depicts an illustrative communication network in accordance with one implementation of the present disclosure.

Aspects and implementations of the present disclosure are directed to device monitoring. The systems and methods disclosed can be employed with respect to network security, among other fields. More particularly, it can be appreciated that access to network resources by unauthorized devices or users is a significant and growing problem. At the same time, the proliferation of network-connected devices (e.g., smartphones, tablets, televisions, security cameras, wearable devices, etc.) can make it difficult to effectively manage access to network resources for those users or devices that are authorized. Accordingly, described herein in various implementations are systems, methods, techniques, and related technologies, that enable the ongoing monitoring of devices based on context (including communication between devices, bandwidth usage, protocol usage, and behavior profiles) and in some cases taking one or more actions (e.g., modifying network access) based on the device context.

Existing methodologies may monitor devices individually without consideration of network structure. That is, devices on a network are not analyzed based on how each device is connected in the network. The information thus includes basic segmented pieces of information which does not depict the different relations between devices and the network.

It is appreciated that many attacks on a network may laterally traverse across devices of a network and therefore devices should not be analyzed in isolation. How devices are connected to a network and what other devices they are connected to can be very important for protecting against attacks (e.g., attacks that could move across a network) or slowing attacks. Embodiments thus determine a context including how devices are communicatively coupled to more accurately assess risk. Embodiments may thereby provide contextual network access control based on how devices are communicatively coupled.

Embodiments can include a network monitor device operable to gather information about a device based on other devices that the device communicates with or is connected to and thereby determine a network context for the device. The network context can be used for correlating various information to enable an understanding of network topology and device functionality and enable actions (e.g., one or more security actions including modifying network access) to be performed thereto.

Embodiments thus learn the network context of devices to determine information including a network profile and combine that with a behavior for each device to more effectively monitor devices. The use of network connections and communications between devices on the network and the connection characteristics (e.g., protocol, bandwidth usage, etc.) can be used to gather information about a device and the network's behavior. This enables a more complete assessment of a device's security posture (e.g., including the operating system (OS), applications present, running, or both, vulnerabilities, patch level, communications, behavior, etc.). The consideration of a device's communication connections to one or more other devices provides multi-layered information that allows for making accurate access and compliance decisions based on device context. This can allow security operators or administrators to sift through a vast amount of network information and focus on devices that matter (e.g., those above a low risk level) or those that are potentially vulnerable and could be used to breach the network.

In some embodiments, a network graph is determined based on how various devices on a network communicate with each other. The network graph may be created based on the how the devices communicate and each node of the network graph is initially set to low risk. A scan may then be performed on each of the devices on the network to determine a risk level. The determination of a device as high risk may be based on one or more security properties or security posture. For example, the scan may be based on a policy that when a device meets one or more conditions of the policy (e.g., outdated anti-virus definitions or malware present), the device is considered to be a high risk. Devices that do not meet the one or more conditions of the policy may be considered low risk.

The determination of device as high risk may also be determined based on an indicator of compromise (IOC). An IOC is an artifact (e.g., observed on a network or in an operating system) that with a high confidence indicates a computer intrusion. IOCs may include or be a combination of: virus signatures, internet protocol (IP) addresses, MD5 hashes of malware files, uniform resource locators (URLs) (e.g., of a request to communicate with a malicious website), domain names of botnet command and control servers, unusual network traffic, unusual privileged user account activity, login anomalies, increases in database read volume, suspicious registry or system file changes, unusual domain name system (DNS) requests, and Web traffic showing non-human behavior. IOCs may further be time dependent (e.g., an IOC may be removed if an IOC has been determined to be a false positive, if an IOC does not meet a user configured criteria for IOCs to be monitored, or if a particular sequence of one or more packets or events is observed on the network).

The network graph may be used to determine the risk level of each device, for instance which devices are likely to have a change in risk (e.g., in the future). For example, if a device A is determined to be compromised by malware then based on a device B having a communication connection with device A, device B may be considered to be at risk of being compromised by the malware and thus at an increased risk level. Such information could be used to contain or restrict an attack on a network by blocking network access of the device A which is compromised before the connection with device B is used to compromise device B with the malware.

The network graph may further be used to determine which devices have become low risk (e.g., devices that have been patched, effectively vaccinated against a threat, or had a compromised component replaced via reinstallation). As another example, if device A is a patch management system and a device B has a communication connection with device A, then the communication connection can be used to imply that device B will be patched by device A. This can be used to determine that devices that are likely to be patched (e.g., patched promptly) and thereby more likely to be protected from threats.

Embodiments may thus add a third risk level between the high risk and low risk levels. The third risk level may be referred to as medium risk and include one or more devices that are neighbors or have a communication connection (e.g., past or open communication connections) with a device that is considered high risk. This allows more focused monitoring and actions to be taken on a network because the medium and high risk devices can be focused thereon. Embodiments may further support additional risk levels in addition to high, medium, and low risk levels.

A group referred to as a "hotzone" includes high risk devices and the neighbors (e.g., immediate neighbors) of the high risk devices, which are medium risk devices that can be tracked and focused on for security analysis. The hotzone may thus be a logical union of a set of one or more high risk devices and the medium risk devices adjacent thereto. An immediate neighbor may be a device that has communicated (e.g., directly or indirectly, for instance through a network switch or other communication device) with a high risk device. A neighbor can further be a device that has communicated with a particular device via one or more other devices (e.g., one or more network switches or other devices that may be between a device and the device's neighbor). In some embodiments, a neighbor may be defined by a policy. For example, a device that has received or sent communication to a high risk device may be a neighbor. A neighbor may also be defined by communicating with a high risk device using one or more pre-selected protocols (e.g., remote desktop protocol (RDP), server message block (SMB) protocol, Windows™ management instrumentation (WMI) protocol, Windows™ remote management (WinRM), or secure shell (SSH)).

The grouping of devices according to risk level (e.g., non-compliant with a policy) and allowing viewing of connections from or to the group enables smarter detection and monitoring of devices. Smarter control is enabled because actions can be initiated on devices or segments in the hotzone and thereby not limited to high risk devices. For example, each device that has communicated with a high risk device may be scanned or blocked (e.g., from network resources). This allows for more frequent checks and stricter controls on specific, pin-pointed area of the network that are at increased risk. Visualization of the network graph is also supported with different levels of display and filtering.

In some embodiments, a grade or score of device risk is calculated using a combination of one or more factors. The factors may include the various pieces of information described herein (e.g., device and communication information) and the length of the communication path from a device to a high risk device and additional information related to the nature of the communication (e.g., protocols used, data transferred, bandwidth).

Various communications as described herein may be described with respect to a session as client property or session as server property. The session as client property indicates that a device that has received network traffic (e.g., one or more packets) from another device and the network traffic satisfies a condition of a filter. The session as server indicates that a device has generated network traffic that was sent to another device and the network traffic satisfies a condition of a filter. The filter may be based on source IP address, destination IP address, server port, protocol, bandwidth, payload, etc. It is appreciated that embodiments may process, analyze, utilize, and make determinations based on communications in other ways or properties (e.g., based on monitoring network traffic, for instance by sniffing network traffic).

In some embodiments, a neighbor is a device that either has a property (e.g., Netflow information) of session as client to a non-compliant or high risk device or has a property of session as server from high risk device. A neighbor may also be a device that has sent or received one or more packets to or from a non-compliant or high risk device (e.g., as determined based on monitoring or sniffing network traffic). In other words, a device is in a hotzone if that device has either sent data to a device that has been identified as high risk or received data from a device that has been identified as high risk. The session as property can be used to determine whether a data transfer was to or from the high risk device to allow filtering of the directions of communication being monitored. The communications used may further include jFlow, sFlow, FlowLogs, firewall events, etc.

A neighbor device may thus be based on receiving a communication from another device or sending a communication to the other device. If a first device is considered high risk, then a second device that has communicated with the first device can be considered medium risk or suspicious. The second device may thus be scanned or examined more closely before being determined to be low risk. It is appreciated that devices that been in communication (e.g., session as client or session as server) with a device that is high risk (e.g., based on a policy) may not have been compromised, infected, etc., but should be considered suspicious and monitored or examined more closely or thoroughly because of an elevated risk of compromise in the future. It is appreciated that the risk level of each device may change over time and the neighbors of each device may change over time.

Embodiments may thus use communications in either direction to determine if a device is a neighbor of a high risk device. For example, a communication from a high risk device to another device can be used to determine that a device is a neighbor. A communication from a device to a high risk device can be used to determine that a device is a neighbor. Embodiments can support determining neighbors based on a communication from one device to multiple devices (e.g., multicast).

Embodiments may further support determination of a list of one or more devices based on a session as client property. For example, using the session as client property can be used to determine the neighboring devices that have received communication from a high risk device, a medium risk devices, or one or more specific devices of one or more risk levels. This may be used to determine medium risk or suspicious devices in less time than determining neighbors based on both the session as client and session as server properties.

Embodiments may further gather information from external (e.g., third party) systems including firewall and SIEM systems. For example, an indicator of compromise (IOC) associated with a device may be a basis for determining a device to be high risk. The device may further be inspected or probed for vulnerabilities or other risk associated behavior. As another example, if there is an IOC associated with a device and one or more packets are observed along with an abnormal connection (e.g., to a suspicious external server), this can be used to determine the device is a high risk.

Accordingly, described herein in various implementations are systems, methods, techniques, and related technologies, which enable device and communication monitoring and performing actions (e.g., one or more notification actions or security actions) based on risk level and communication between devices. As described herein, various pieces of information can be collected from network devices and network traffic to provide context information for monitoring devices and determining risk level.

It can be appreciated that the described technologies are directed to and address specific technical challenges and longstanding deficiencies in multiple technical areas, including but not limited to network security, monitoring, and policy enforcement. It can be further appreciated that the described technologies provide specific, technical solutions to the referenced technical challenges and unmet needs in the referenced technical fields.

In some embodiments, additional sources of device information may be used to monitor and determine a risk level of a device. If an agent is present on the device (e.g., a personal computer (PC) or server), the agent can collect and provide detailed device information (e.g., open communication connections, services running, etc.). If an agent is not present, e.g., on a mobile device, data from other systems, e.g., a vulnerability assessment (VA) system, an advanced threat detection (ATD) system, a mobile device management (MDM) system, a firewall (FW) system, a switch system, and an access point (AP) system can be used to gather additional information.

FIG. 1 depicts an illustrative communication network 100, in accordance with one implementation of the present disclosure. The communication network 100 includes a network monitor device 102, a network device 104, an aggregation device 106, a system 150, devices 120 and 130, and network coupled devices 122a-b. The devices 120 and 130 and network coupled devices 122a-b may be any of a variety of devices including, but not limited to, computing systems, laptops, smartphones, servers, Internet of Things (IoT) devices, supervisory control and data acquisition (SCADA) devices, operational technology (OT) devices, campus devices, data center devices, edge devices, etc. It is noted that the devices of communication network 100 may communicate in a variety of ways including wired and wireless connections and may use one or more of a variety of protocols.

Network device 104 may be one or more network devices configured to facilitate communication among aggregation device 106, system 150, network monitor device 102, devices 120 and 130, and network coupled devices 122a-b. Network device 104 may be one or more network switches, access points, routers, firewalls, hubs, etc.

Network monitor device 102 may be operable for a variety of tasks including determining high risk devices (e.g., malware present, virus infection, out of date virus definitions, out of date malware definitions, etc.), determining medium risk devices, and determining low risk devices. A medium risk device is a device that has communicated with one or more high risk devices. A low risk device is a device which has not communicated with a high risk devices and does not have a vulnerability (e.g., based on a policy or other vulnerability information). Network monitor device 102 may initiate one or more actions, as described herein, based on one or more devices being determined to be medium risk or high risk.

Network monitor device 102 may be a computing system, network device (e.g., router, firewall, an access point), network access control (NAC) device, intrusion prevention system (IPS), intrusion detection system (IDS), deception device, cloud-based device, virtual machine based system, etc. Network monitor device 102 may be communicatively coupled to the network device 104 in such a way as to receive network traffic flowing through the network device 104 (e.g., port mirroring, NetFlow, etc.). In some embodiments, network monitor device 102 may include one or more of the aforementioned devices. In various embodiments, network monitor device 102 may further support high availability and disaster recovery (e.g., via one or more redundant devices).

In some embodiments, the determination of a device as medium risk may be based on the device communicating with a high risk device using a particular protocol (e.g., Samba, hypertext transfer protocol (HTTP), SSH, file transfer protocol (FTP), transfer control protocol/internet protocol (TCP/IP), user datagram protocol (UDP), Telnet, HTTP over secure sockets layer/transport layer security (SSL/TLS), server message block (SMB), point-to-point protocol (PPP), remote desktop protocol (RDP), windows management instrumentation (WMI), windows remote management (WinRM), etc.). For example, if there is communication between a high risk device (e.g., a device with out of date virus definitions) and a low risk device through a file sharing protocol, the low risk device may be determined to be a medium risk device. In some embodiments, the protocols used for communication may be specified by a policy thereby enabling devices that are using particular protocols to be determined to be medium risk. The protocols tracked can also be used as a filter for monitoring communications over particular protocols for determining medium risk devices. The selection of protocols thus allow granularity in selecting the kind of communications that might be risky (e.g., expose a machine to risk) or infections. This can allow determinations of medium risk devices to be more efficient than analyzing communications for each protocol a device uses.

The determination of a device risk level enables the creation of groups (e.g., high risk, medium risk, and low risk groups) for grouping devices according to risk, focused detection of activity on the network (e.g., allowing monitoring of risk increasing activity spreading across a network), and higher granularity of identification of non-compliant or high risk devices and other types of risk. The medium risk level further allows focus on one or more devices that might be the next devices to be subject to compromise. More efficient or smarter control is therefore enabled because control actions (e.g., changing network access, blocking access, installing new patches or updates, formatting a device, etc.) can be focused to ensure security. It is appreciated that creation of groups, better detection of activity on a network, and identification of non-compliant or high-risk devices may be done without determining medium risk devices.

More frequent checks may be performed on the hotzone (e.g., high and medium risk devices). Additional checking resources may thus be focused on devices that have above low risk levels. For example, entire checks or sweeps of the devices on the network may be avoided in favor of more targeted checks of devices with a risk level above the low risk level.

Embodiments may visually depict or display the various risk levels. For example, device and risk level may be displayed in a list or as a network graph. In some embodiments, a respective color is associated with each risk level. For example, the color grey or green may be associated with low risk devices, the color yellow may be associated with medium risk devices, and the color red associated with high risk devices. Devices associated with a red color may be determined based on the device meeting conditions (e.g., virus infection) or not meeting conditions (e.g., not having up to date anti-virus definitions) of a policy.

The monitoring of devices by network monitor device 102 may be based on a combination of one or more pieces of information including traffic analysis, information from external or remote systems (e.g., system 150), information from an agent (e.g., agent 140), communication (e.g., querying) with an aggregation device (e.g., aggregation device 106), and querying the device itself, which are described further herein. Network monitor device 102 may be operable to use one or more application programming interfaces (APIs) to communicate with aggregation device 106, device 120, device 130, or system 150.

Information from one or more external or $3^{rd}$ party systems (e.g., system 150) may further be used in determining a risk level of a device and whether to perform an action (e.g., a notification action or a security action). For example, syslog or flow control information sources may be used to determine one or more devices that have communicated with a high risk device. External or $3^{rd}$ party systems may also be used to perform a scan or a check on a device to determine a risk level (e.g., high risk or low risk level).

Network monitor device 102 may determine devices that are communicating which are not supposed to be communicating (e.g., according to network design or administrator) and can thereby indicate whether the topology of the network is risky. For example, if many devices or even a majority of devices of a network are determined to be in communication with a single device, this can be indicative that a single device is able to communicate with (or able to connect to) too many other devices and therefore presents a significant risk if it were to be compromised. This can reflect that a network is not segmented properly and therefore lacks the proper blocks and protections between different parts of the network. As another example, if a single device is determined to be high risk and the other devices of a network are determined to be medium risk, this can indicate that the network topology is quite risky because a single virus infection would not be prevented by the network architecture from spreading to the rest of the network.

In some embodiments, one or more devices may be visually depicted as having communicated with each other and thereby show communication connections throughout a network. This can be used to indicate that networks that are thought to be separate are not separated. For example, embodiments may be operable to receive network graphs associated with multiple networks and then output the graphs with communication between the devices shown thereby indicating that the networks are able to communicate with each other even though they were supposed to be separate (e.g., isolated by network design).

Network monitor device 102 may further be operable for determining which devices may create significant risk. For example, a printer may be attacked, e.g., by coupling a USB device with a malicious software program, the printer may be determined to be high risk and a majority of the devices on the network may be at risk based on having communicated with the printer.

Network monitor 102 may further provide visibility into attempted communications between devices. For example, if a network has been designed so that device A should not be able to communicate with device B, embodiments can monitor attempts by device A to communicate with device B (e.g., based on logs of router firewall access control list (ACL) indicating that the communication was blocked). Network access of device A may then be restricted (e.g., based on a policy) based on numerous attempts to communicate with device B, which may be indicative a compromise or increased risk of device A. In some embodiments, a policy may be used to define increasingly aggressive or restrictive actions based on the attempted communications monitored. In various embodiments, one or more actions may be taken with respect to devices that have communicated (e.g., neighbors) with device A that is making numerous attempts to communicate with device B. The attempted communications may be visually depicted, e.g., in a network graph or a list, and thereby allow visual confirmation of network configuration working as designed and as validation of the network configuration. Embodiments thus support monitoring of attempted communication and responding to attempted communication in manners similar to those described herein with respect to communications between devices.

Network monitor 102 may further determine risk levels of devices in a cloud. For example, logs or other network information (e.g., network traffic) of devices in a cloud can be used to determine one or more devices that have communicated with a device having a high risk level.

Network monitor device 102 may use one or more sources of information to determine a device risk level. Network monitor device 102 may access communication information based on sniffing or passive observation of network traffic and analysis thereof. Network monitor 102 may also access communication information based on a flow protocol (e.g., Netflow originally from Cisco Systems of San Jose, Calif., s-Flow, Jflow, Netstream, Cflow, and Rflow) which allows tracking of network traffic through a network interface. In some embodiments, an application programming interface (API) may be used with a flow protocol plugin to access flow protocol data. Network monitor device 102 may further use one or more logs of network traffic to determine communication between devices.

In some embodiments, network monitor device 102 may group one or more devices that have communicated with a high risk devices in a neighbor group. Actions (e.g., notification, for instance a HTTP notification, a portal restricting access, an IT ticket, an email, a SMS, etc. or network access changes) may be applied to the neighbor group based on having communication with the high-risk device. The group may be dynamically determined and change over time. Groups may be used to apply one or more policies. For example, a neighbor group of non-compliant devices could be determined by network monitor device 102 and a policy can be applied to each device that is a member of the group.

Network monitor device 102 may monitor communication dynamically, periodically, or a combination thereof. Network monitor device 102 may thus dynamically determine devices that are high risk, medium risk, and low risk. One or more devices may thus change risk level over time and go in and out of a hotzone group. For example, if anti-virus software is uninstalled from a device, that device will be determined to be high risk and neighbor devices that have communicated with the device that no longer has anti-virus software will be determined to be medium risk. Upon installation of the anti-virus software from the device that had anti-virus software removed, the device will be determined to be low risk and the devices that communicated with the device that had anti-virus software removed will be determined to be low risk. As another example, if device A communicated with device B during a first time period during which device A was not classified as a high risk device, and during a second time period after the first time period, device A is classified a high risk, then device B may be classified as high risk. The increased risk classification of device B may be determined even though device A and device B have not communicated for some period of time (e.g., a while or possibly even a long period of time). The increased risk classification of device B can mark or flag device B as a device that should be monitored based on the possibility that one or more of the communications from device A to device B may have compromised the security of device B.

In some embodiments, network monitor device 102 can evaluate the risk of devices that are multiple degrees of separation away from a device that is determined to be high risk (or other risk levels). For example, if a device A is determined to be high risk and has communicated with a device B, the device B may be determined to be medium risk and devices that have communicated with device B (not including device A) are determined to be medium risk. For instance, a device C that has communicated with the device B but not with device A may be determined to be medium risk based on being two degrees of separation from the high risk device A. In other words, a neighbor (e.g., device C) of a neighbor (e.g., device B) of a high risk device (e.g., device A) can be determined to be medium risk.

In some embodiments, different colors may be associated with devices that are more degrees of separation away from a high risk device. For example, the colors pink or green may be used to visually depict devices that are one or more devices away from a high risk device.

Network monitor device 102 may analyze the bandwidth of traffic between devices in determining a risk level of the devices. This can be determined based on a baseline of bandwidth usage tracked over a period of time. For example, if two devices typically have a low amount of traffic between them but then a large spike in communication bandwidth usage is observed, the two devices may be determined to be medium risk or suspicious and warranting further monitoring. As another example, if a printer is observed normally receiving large amounts of data and sending a relatively small amount of data, if the printer is now observed sending large amounts of data, the printer may be determined to be high risk or medium risk or suspicious and in need of further analysis. In one embodiment, an operator of network monitor device 102 may override the risk level assigned to one or more devices (e.g., if risk level is based on a false positive).

Network monitor device 102 may further determine the risk of a device based on a pattern of communication. For example, network monitor device 102 may monitor network traffic based on a particular HTTP user-agent string used to identify a mobile device and a particular port to monitor traffic from a particular protocol and device type. A device using the particular HTTP user-agent string and particular port may be monitored and found to be transmitting with a pattern of sending a relatively small amount of data then waiting a minute before sending another relatively small amount of data. If this communication pattern is similar to a known virus or botnet, the device may be determined to be medium risk or suspicious and in need of further analysis. As another example, if a new proxy device is added to a network and many devices are suddenly communicating with the new proxy device, the device may be determined to be medium risk and in need of further analysis. For example, a notification with information about the proxy device could be sent to an IT administrator.

The protocol associated with regular communication between devices may also be used to determine communication between devices is suspicious or needs further analyzing. For example, if two devices usually communicate (e.g., based on observed network traffic) using a first protocol and switch to communicating on another protocol, the devices may be determined to be medium risk or in need of further analysis.

In some embodiments, a threshold may be used to determine whether a device is medium risk or not. For example, there may be a threshold for abnormal bandwidth usage between two devices. As another example, if five devices on a network exceed a bandwidth or traffic threshold associated with a particular protocol, the five devices may be determined to be high risk and depicted with red dots. The five devices may then be disconnected from the network based on changing network access (e.g., changing the VLAN of the five devices).

In some embodiments, network monitor device 102 may determine a device risk score based on multiple criteria as mentioned herein. For example, the criteria may include: whether the device communicated directly with a high risk device, whether the traffic bandwidth from the device deviated from expected traffic bandwidth, whether the protocol use of the device deviated from the expected protocols, etc. In various embodiments, an operator of network device monitor 102 can add, move, or remove devices from various risk groups. Embodiments may support multiple risk groups or hot zones.

In some embodiments, network monitor device 102 may be operable to exclude particular devices from a hotzone or group of devices neighboring a high risk device. For example, network monitor device 102 may be operable to exclude a network access control (NAC) device, NAC management devices, routers, or other networking devices from those considered to be medium risk. Port and protocols may be used to exclude certain network traffic from consideration in determining devices that have communicated with a high risk device. Network monitor device 102 may statically or dynamically exclude devices (e.g., medical devices may be excluded from being in a hot zone).

Network monitor device 102 may also be operable to monitor various states of devices throughout network 100. For example, network monitor device 102 may monitor a patch status of each device and can thereby track and visually depict as a patch that is installed on a patch server is propagated to each device on the network. Devices without the patch may be depicted as red while devices that have been patched are depicted as green. Embodiments may thus be used to track and ensure that updates, patches, etc., are propagated throughout a network.

Network monitor device 102 may further be operable to determine whether isolation or airgaps exist between management, data sensitive, corporate, demilitarized zone (DMZ) systems or devices based on the tracking of connections between the various devices. For example, a company may want to have complete isolation between OT and IT systems. Network monitor device 102 may monitor each device that communicates with OT devices and each device that communicates with IT devices and verify that the IT and OT devices are isolated (e.g., no communication of an IT device with an OT device and vice versa).

The determination of risk of a device may also be determined by network monitor device using behavioral profiles of devices. For example, if device is a thermostat or lighting system and the device usually sends a relatively small amount of data at a regular interval. Upon the device being detected as sending relatively high amounts of data to another device with irregular interval, the device may be determined to be medium or high risk and subject to further analysis. A device may thus be classified based on network context including behavior profile, protocols, network activity, and traffic volume.

Network monitor device 102 may store the behavior of device which may be used for forensic analysis. The data stored may be used to determine how an attack spread through a network. The data could also be sent to another system (e.g., system 150). The data may be stored in a system that is ready for analysis by another system.

Device 130 can include agent 140. The agent 140 may be a hardware component, software component, or some combination thereof configured to gather information associated with device 130 and send that information to network monitor device 102. The information can include the operating system, version, patch level, firmware version, serial number, vendor (e.g., manufacturer), model, asset tag, software executing on a device (e.g., anti-virus software, malware detection software, office applications, web browser(s), communication applications, etc.), services that are active or configured on the device, ports that are open or that the device is configured to communicate with (e.g., associated with services running on the device), media access control (MAC) address, processor utilization, unique identifiers, computer name, account access activity, etc. The agent 140 may be configured to provide different levels and pieces of information based on device 130 and the information available to agent 140 from device 130. Agent 140 may be able to store logs of information associated with device 130. Network monitor device 102 may utilize agent information from the agent 140.

System 150 may be one or more external, remote, or third party systems (e.g., separate) from network monitor device 102 and may have information about devices 120 and 130 and network coupled devices 122a-b. System 150 may include a vulnerability assessment (VA) system, a threat detection (TD) system, a mobile device management (MDM) system, a firewall (FW) system, a switch system, an access point system, etc. Network monitor device 102 may be configured to communicate with system 150 to obtain information about devices 120 and 130 and network coupled devices 122a-b on a periodic basis, as described herein. For example, system 150 may be a vulnerability assessment system configured to determine if device 120 has a computer virus or other IOC.

The vulnerability assessment (VA) system may be configured to identify, quantify, and prioritize (e.g., rank) the vulnerabilities of a device. The VA system may be able to catalog assets and capabilities or resources of a device, assign a quantifiable value (or at least rank order) and importance to the resources, and identify the vulnerabilities or potential threats of each resource. The VA system may provide the aforementioned information for use by network monitor 102.

The advanced threat detection (ATD) or threat detection (TD) system may be configured to examine communications that other security controls have allowed to pass. The ATD system may provide information about a device including, but not limited to, source reputation, executable analysis, and threat-level protocols analysis. The ATD system may thus report if a suspicious file has been downloaded to a device being monitored by network monitor device 102.

The mobile device management (MDM) system may be configured for administration of mobile devices, e.g., smartphones, tablet computers, laptops, and desktop computers. The MDM system may provide information about mobile devices managed by MDM system including operating system, applications (e.g., running, present, or both), data, and configuration settings of the mobile devices and activity monitoring. The MDM system may be used get detailed mobile device information which can then be used for device monitoring (e.g., including device communications) by network monitor device 102.

The firewall (FW) system may be configured to monitor and control incoming and outgoing network traffic based on security rules. The FW system may provide information about a device being monitored including attempts to violate security rules (e.g., unpermitted account access across segments) and network traffic of the device being monitored.

The switch or access point (AP) system may be any of a variety of network devices (e.g., network device 104 or aggregation device 106) including a network switch or an access point, e.g., a wireless access point, or combination thereof that is configured to provide a device access to a network. For example, the switch or AP system may provide MAC address information, address resolution protocol (ARP) table information, device naming information, traffic data, etc., to network monitor device 102 which may be used to monitor devices and control network access of one or more devices. The switch or AP system may have one or more interfaces for communicating with IoT devices or other devices (e.g., ZigBee™, Bluetooth™, etc.), as described herein. The VA system, ATD system, and FW system may thus be accessed to get vulnerabilities, threats, and user information of the device being monitored in real-time which can then be used to determine a risk level of the device.

Aggregation device 106 may be configured to communicate with network coupled devices 122a-b and provide network access to network coupled devices 122a-b. Aggregation device 106 may further be configured to provide information (e.g., operating system, device names, application present, running, or both, vulnerabilities, patch level, etc.) to network monitor device 102 about the network coupled devices 122*a-b*. Aggregation device 106 may be a wireless access point that is configured to communicate with a wide variety of devices through multiple technology standards or protocols including, but not limited to, Bluetooth™, Wi-Fi™ ZigBee™, Radio-frequency identification (RFID), Light Fidelity (Li-Fi), Z-Wave, Thread, Long Term Evolution (LTE), Wi-Fi™ HaLow, HomePlug, Multimedia over Coax Alliance (MoCA), and Ethernet. For example, aggregation device 106 may be coupled to the network device 104 via an Ethernet connection and coupled to network coupled devices 122*a-b* via a wireless connection. Aggregation device 106 may be configured to communicate with network coupled devices 122*a-b* using a standard protocol with proprietary extensions or modifications.

Aggregation device 106 may further provide log information of activity and properties of network coupled devices 122*a-b* to network monitor device 102. It is appreciated that log information may be particularly reliable for stable network environments (e.g., where the types of devices on the network do not change often).

Figure 2:
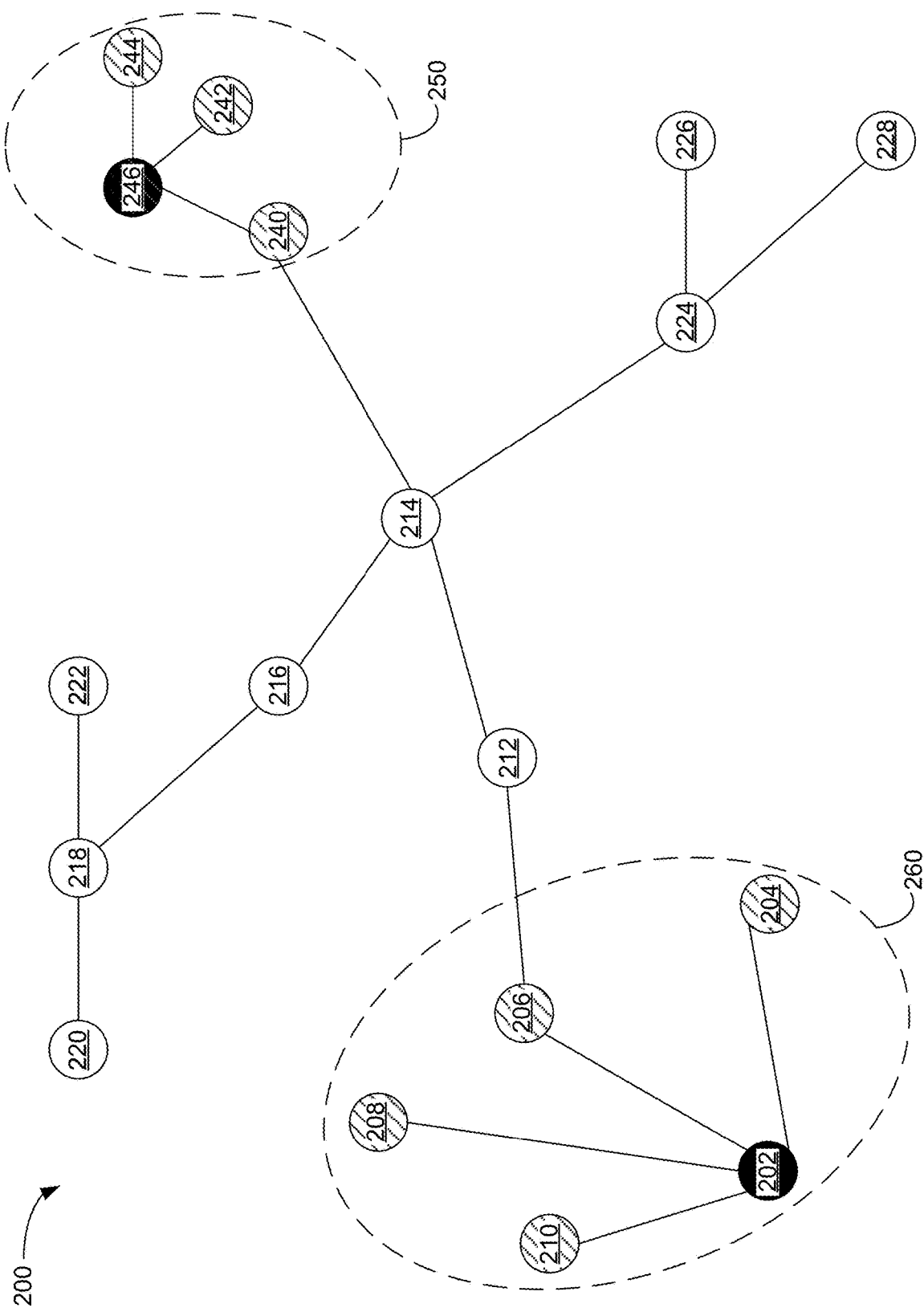
FIG. 2 depicts an example network graph for use in monitoring devices on a network and tracking device risk in accordance with aspects and implementations of the present disclosure.

FIG. 2 depicts an example network graph 200 for use in monitoring devices on a network and tracking device risk in accordance with aspects and implementations of the present disclosure. Example network graph 200 includes vertices or nodes 202-246 which represent devices (e.g., devices 120-130) on a network (e.g., network 100). The edges or lines between nodes are associated with communication between devices. The network graph 200 including the risk level of each node and grouping of nodes may be determined by a device operable to monitor devices communicatively coupled to a network (e.g., network monitor device 102).

Nodes 246 and 202 represent devices that have met the requirements of a policy. For example, the devices represented by nodes 246 and 202 may have out of date (e.g., more than a day old) virus definitions or not have anti-spyware software installed. Based on the policy these devices may be determined (e.g., by network monitor device 102) to be high risk, as described herein. Nodes 202 and 246 may be displayed as red in a graphical user interface based on being high risk.

The devices associated with nodes 204-210 are determined to have communicated with the device associated with node 202 and determined to be medium risk or suspicious based on having communicated with the device associated with node 202. The nodes 202-210 are grouped into a hotzone or group 260, as described herein, based on having communicated with the device associated with node 202.

The devices associated with nodes 240-244 are determined to have communicated with the device associated with node 246 and determined to be medium risk or suspicious based on having communicated with the device associated with node 246. The nodes 240-244 are grouped into a hotzone or group 250, as described herein, based on having communicated with the device associated with node 246. Nodes 204-210 and 240-244 may be displayed as yellow in a graphical user interface based on being medium risk.

Figure 3:
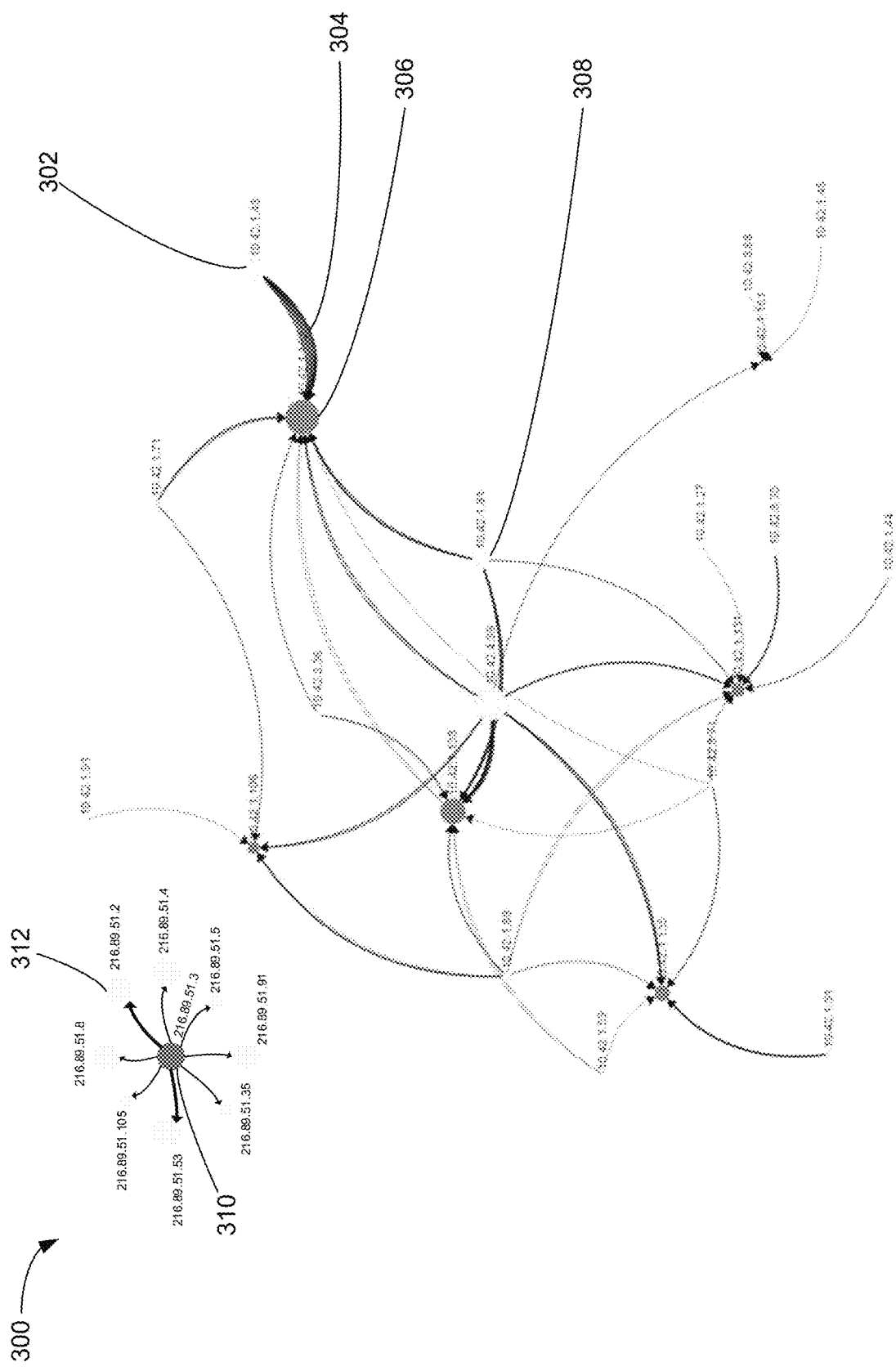
FIG. 3 depicts an example graphical user interface including a network graph indicating various risk levels of devices communicatively coupled to a network in accordance with one implementation of the present disclosure.

FIG. 3 depicts an example graphical user interface 300 including a network graph indicating various risk levels of devices communicatively coupled to a network in accordance with one implementation of the present disclosure. Example graphical user interface 300 includes a network graph representing device communications (e.g., devices 120-130) as determined by a device (e.g., network monitor device 102) monitoring communication in a network (e.g., network 100). Example graphical user interface 300 represents a selected hotzone or group having high risk and medium risk devices.

Example graphical user interface 300 includes various nodes representing devices. Example graphical user interface 300 includes an IP address associated with each node that is the IP address of the device associated with the node. For example, node 302 represents a device with IP address of 10.42.1.43, node 306 represents a device with an IP address of 10.42.1.152, and node 308 represents a device with an IP address of 10.42.1.81. Node 310 represents a device with an IP address of 216.89.51.3 and node 312 represents a device with an IP address of 216.89.51.2. Example graphical user interface 300 can depict devices that are in separate networks and devices that are just communicating among themselves. For example, the devices in the 10.41.x.x address range and the 216.x.x.x address range may be on separate networks or be devices that are communicating with devices in their respective IP address range.

Lines or edges of the network graph of example graphical user interface 300 depict the direction of traffic between two nodes with an arrow, and the quantity of traffic depicted with line thickness. For example, the majority of traffic between two nodes may be indicated by an arrow on the line(s) going from one node to another node. Lines 304 represents that a majority of communication traffic between nodes 302 and 306 is going from node 302 to node 306. In some embodiments, the thickness of the line may also be used to indicate bandwidth where thicker lines between two devices indicate more traffic.

In some embodiments, the size of nodes in example graphical user interface 300 represent the relative amount of network traffic that a node receives. For example, node 306 is larger because node 306 has received more traffic from multiple nodes as compared node 302 or node 308 which are relatively smaller.

The nodes of the network graph of example graphical user interface 300 may further be colored according to risk level. For example, node 306 may be determined to be high risk based on a policy, as described herein, and colored red. Nodes 302 and 308 may be determined to be medium risk based on communicating with node 306, as described herein, and colored yellow. It is appreciated that the thickness of lines, size of nodes, colors, and other visual aspects of example graphical user interface 300 may be customized in a variety of ways to differentiate various aspects of communications and the nodes.

In some embodiments, graphical user interface elements may allow for selecting of a group (e.g., associated with a policy) and filtering of the hotzone display based on groups, IP ranges, traffic filtering, segments, ports, bandwidth (e.g., in bits per second (bps)), packet rate (e.g., in packets per second (pps)), matched policies, and from a start time to an end time. In various embodiments, one or more check boxes or selectors may be operable for enabling display of port or protocol on the edges of the graph. As more data is shown on edges of the graph, zoom functionality may be used to zoom in to view particular parts of a network and associated data.

Figure 4:
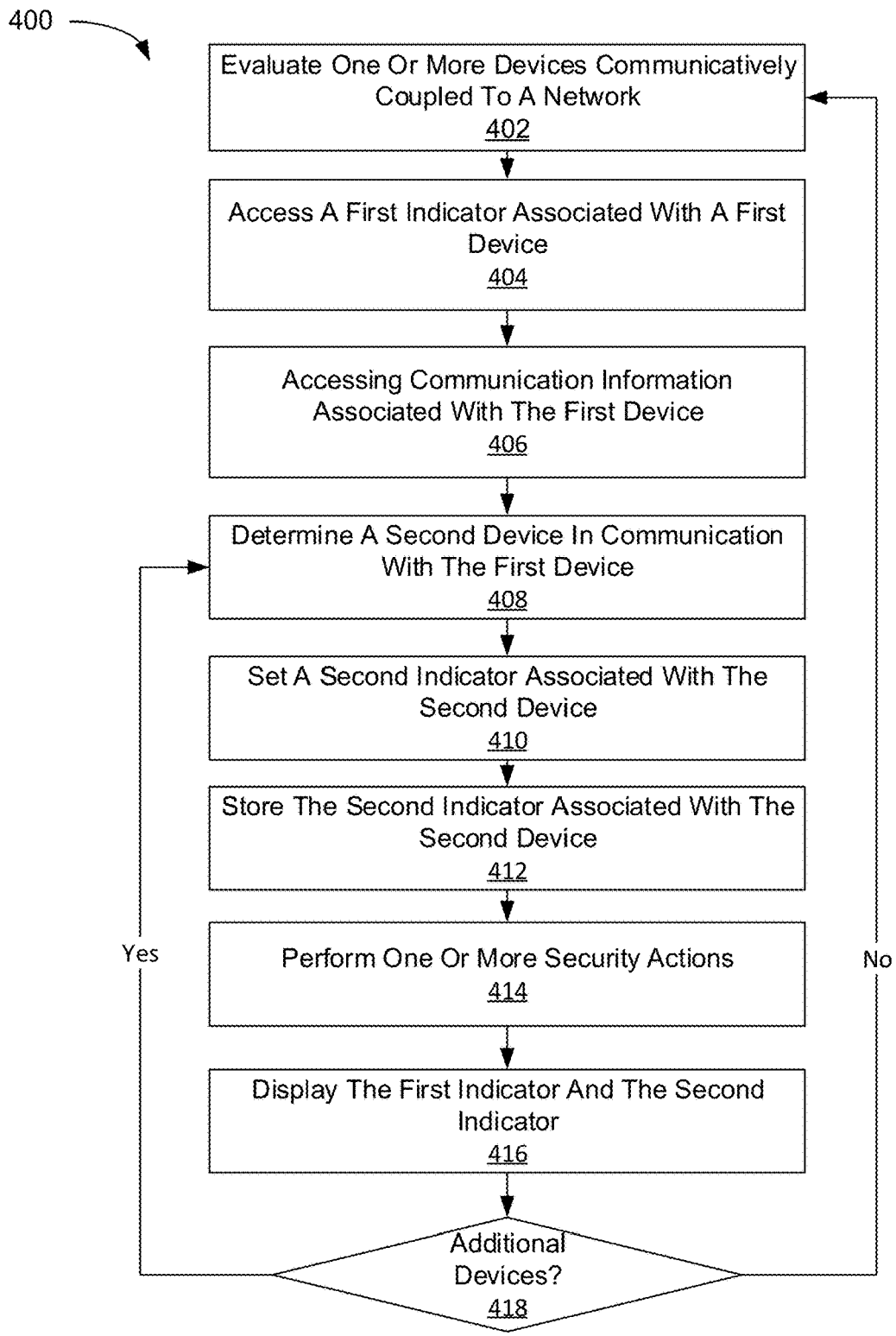
FIG. 4 depicts a flow diagram of aspects of a method for device monitoring in accordance with one implementation of the present disclosure.

With reference to FIG. 4, flowchart 400 illustrates example functions used by various embodiments. Although specific function blocks ("blocks") are disclosed in flowchart 400, such blocks are examples. That is, embodiments are well suited to performing various other blocks or variations of the blocks recited in flowchart 400. It is appreciated that the blocks in flowchart 400 may be performed in an order different than presented, and that not all of the blocks in flowchart 400 may be performed.

FIG. 4 depicts a flow diagram of aspects of a method for device monitoring in accordance with one implementation of the present disclosure. Various portions of flowchart 400 may be performed by different components (e.g., components of system 500) of a device (e.g., network monitor device 102). Flowchart 400 depicts a process for monitoring devices, determining risk level, and optionally (e.g., according to a policy) performing a security action.

At block 402, one or more device communicatively coupled to a network are evaluated. The evaluation may include passive methods (e.g., network traffic monitoring) or active methods (e.g., querying the device itself for software installed or other properties or querying other systems (e.g., system 150)). The devices may be evaluated according to a policy where devices that meet or satisfy one or more conditions of the policy are determined to be at a high risk level. For example, the policy could have a condition that anti-virus definitions are more than one day old or a condition that no anti-spyware be installed.

At block 404, a first indicator associated with a first device is accessed. The results of the evaluation of the devices may be accessed and an indicator that a device is high risk may be accessed. If there are no devices determined to be high risk, then block 402 may be performed.

At block 406, communication information associated with the first device is accessed. As described herein, communication information associated with the high risk device may be accessed. The communication information can include details of communications to and from the high risk device.

At block 408, a second device is determined to be in communication with the first device. As described herein, a device that has communicated with a high risk device is identified based on analysis of communication information.

At block 410, a second indicator associated with the second device is set. As described herein, a risk indicator or level associated with a device that has been in communication with a high risk device can be set to a medium risk level.

At block 412, the second indicator associated with the second device is stored. As described herein, the second indicator indicating that the second device is a medium risk level can be stored for later access (e.g., for displaying at network graph, for instance, as part of graphical user interface 300).

At block 414, one or more security actions are optionally performed. The security action may include a notification (e.g., a HTTP notification, notification via a portal that may restrict access, an IT ticket, an email, a SMS, or combination thereof), change of network access, initiate an update or patch system, etc., as described herein. The security action(s) may be performed with respect to high risk devices and medium risk devices. In some embodiments, one security action may be applied to high risk devices while another security action may be applied to medium risk devices.

A security action may also be performed on a high risk device if malware is detected on a device or some other IOC associated with the device or if some unknown process is running on the device. A security action may then be initiated and the IT department notified. A policy may thus trigger a notification (e.g., a HTTP notification, notification via a portal that may restrict access, an IT ticket, an email, a SMS, or combination thereof), a security action, or combination thereof based on several events or conditions (e.g., non-compliance with a policy, unexpected bandwidth usage, unexpected protocol usage, etc.).

In some embodiments, the security action may include signaling other systems to perform various functions. For example, a firewall may be signaled to restrict access of a device to one or more portions of the network. An anti-malware scan or anti-virus scan may be initiated on the device prior sending a notification (e.g., the notification may be conditional on either of the scans finding malware or a virus).

At block 416, the first and second indicator may be displayed. As described herein, the risk levels associated with the first and second indicators may be displayed (e.g., as red or yellow nodes in a network graph) as part of a graphical user interface (e.g., graphical user interface 300).

At block 418, whether there are additional devices, e.g., with a high risk level, to be analyzed is determined. If there are additional high risk devices, it can be determined whether there are devices that have communicated with the additional devices (e.g., that could be determined to be medium risk). If there are additional high risk devices, block 408 may be performed. If there are not additional high risk devices, block 402 may be performed.

Figure 5:
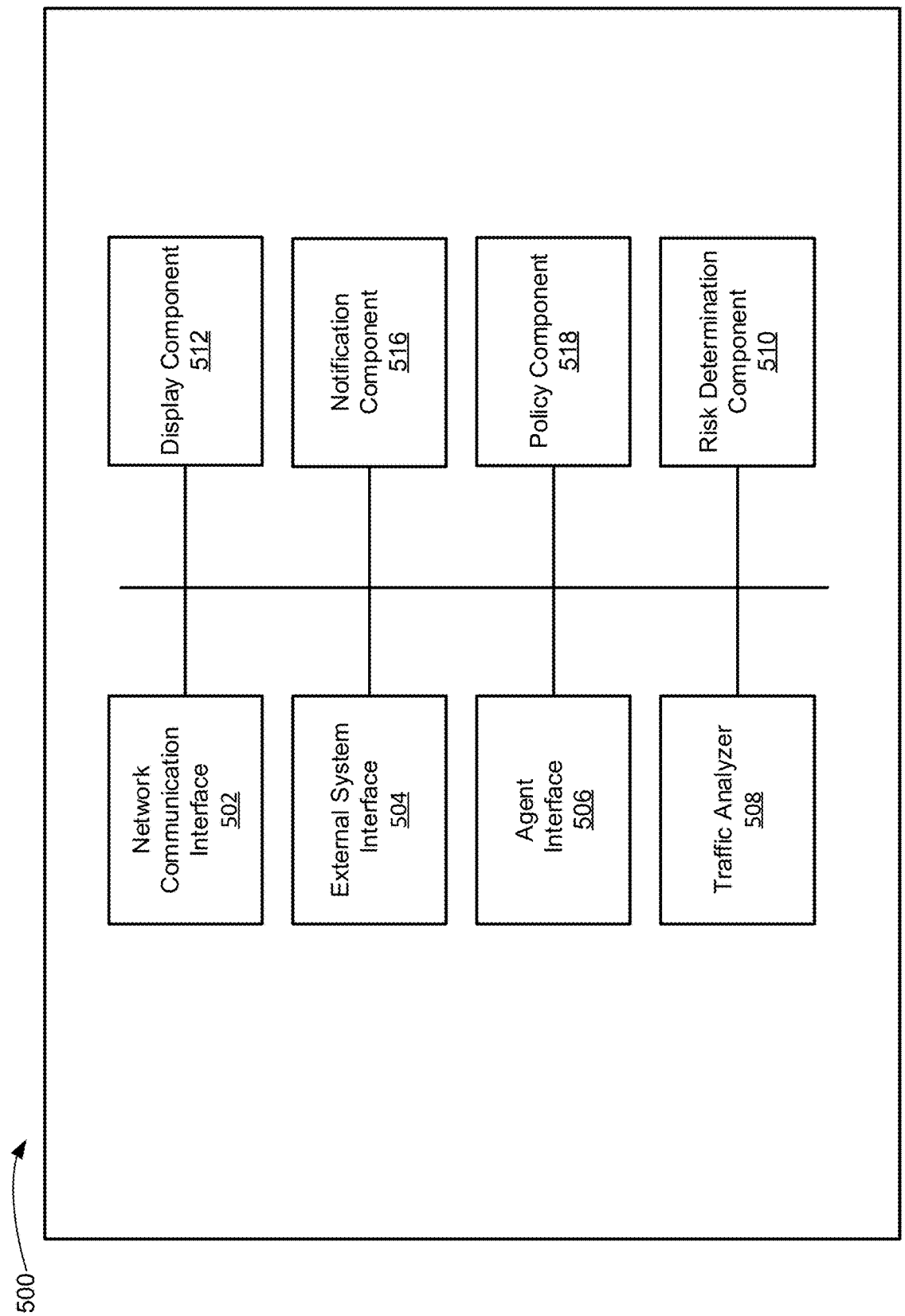
FIG. 5 depicts illustrative components of a system for device risk monitoring in accordance with one implementation of the present disclosure.

FIG. 5 illustrates example components used by various embodiments. Although specific components are disclosed in system 500, it should be appreciated that such components are examples. That is, embodiments of the present invention are well suited to having various other components or variations of the components recited in system 500. It is appreciated that the components in system 500 may operate with other components than those presented, and that not all of the components of system 500 may be required to achieve the goals of system 500.

FIG. 5 depicts illustrative components of a system for device risk monitoring in accordance with one implementation of the present disclosure. Example system 500 includes a network communication interface 502, an external system interface 504, an agent interface 506, a traffic analyzer 508, a risk determination component 510, a display component 512, a notification component 516, and a policy component 518. The components of system 500 may be part of a computing system or other electronic device (e.g., network monitor device 102) or a virtual machine and be operable to monitor risk of one or more devices communicatively coupled to a network. For example, the system 500 may further include a memory and a processing device, operatively coupled to the memory, which may perform the functions of or execute the components of system 500. The components of system 500 may access various data associated with a device being monitored in order to determine a risk level associated with a device. It is appreciated that the modular nature of system 500 may allow the components to be independent and allow flexibility to enable or disable individual components or to extend/upgrade components without affecting other components thereby providing scalability and extensibility. System 500 may perform one or more blocks of flow diagram 400.

Communication interface 502 is operable to communicate with one or more devices (e.g., network device 104) coupled to a network that are coupled to system 500 and receive or access information about devices (e.g., information associated with the communication of one or more devices) coupled to the network, as described herein. The communication interface 502 may be operable to work with one or more components to initiate the monitoring of a device and determination of a risk associated with the device upon a device being coupled to the network.

External system interface 504 is operable to communicate with one or more third party, remote, or external systems to access information about a device to be analyzed or evaluated. External system interface 504 may further store the accessed information in a data store. For example, external system interface 504 may access IOC information from one or more third party systems and store the accessed information in the data store. External system interface 504 may be operable to communicate with a vulnerability assessment (VA) system, an advanced threat detection (ATD) system, a mobile device management (MDM) system, a firewall (FW) system, a switch system, an access point (AP) system, etc. External system interface 504 may query a third party system using an API. For example, external system interface 504 may query a firewall for information about a device or for a list of devices that are communicatively coupled to the firewall. In some embodiments, external system interface 504 may query a firewall or other system for information of communications associated with a device (e.g., a high risk device).

Agent interface 506 is operable to communicate with an agent (e.g., agent 140) of a device that may gather information about a device. Agent interface 506 can receive or access information gathered by the agent (e.g., information about software installed locally, information about patches or updates, etc.), as described herein.

Traffic analyzer 508 is configured to perform analysis of network traffic (e.g., in real-time) to and from a device being monitored. Traffic analyzer 508 may have a packet engine operable to access packets of network traffic (e.g., passively) and analyze the network traffic. For example, packets associated with communication requests may be accessed and analyzed to determine whether a device is initiating communication to another device or receiving communication requests from another device. The traffic analyzer 508 may be configured to perform active or passive traffic analysis or a combination thereof. The traffic analyzer 508 may further be able to access and analyze traffic logs from one or more devices (e.g., network device 104, system 150, or aggregation device 106) or from a device being monitored. The traffic analyzer 508 may further be able to access traffic analysis data associated with a device being monitored, e.g., where the traffic analysis is performed by a third party system.

Risk determination component 510 is configured to access and manage (e.g., store and update) risk information associated with one or more devices coupled to a network, as described herein. Risk determination component 510 is further configured to use communication information associated with one or more devices to determine devices that are in communication with high risk devices and therefore are determined to be medium risk or suspicious, as described herein.

Display component 512 is configured to optionally display a graphical user interface or other interface (e.g., command line interface) for depicting various risk levels (e.g., as determined by risk determination component 510), as described herein. In some embodiments, display component 512 may determine a network graph for displaying as part of a graphical user interface (e.g., graphical user interface 300).

Notification component 516 is operable to initiate a notification based on a device being determined to be high risk or medium risk or meeting one or more conditions of a policy, as described herein. The notification may be any of a variety of notifications, e.g., IT ticket, email, SMS, a HTTP notification, notification via a portal that may restrict access, etc., as described herein.

Policy component 518 is operable for initiating or triggering one or more remediation actions or security actions, as described herein. Policy component 518 may further be configured to perform other functions including checking compliance status, finding open ports, etc. Policy component 518 may restrict network access, signal a patch system or service, signal an update system or service, initiate an action to address one or more compliance issues, etc., as described herein. The policy component 518 may thus, among other things, automatically patch, automatically update, and automatically restrict network access of a device.

The actions may include restricting network access to a particular level (e.g., full, limited, or no network access), remediation actions (e.g., triggering patch systems or services, triggering update systems or services, triggering third party product action, etc.), informational actions (e.g., sending an email notification to a user or IT administrator or creating an IT ticket reflecting the level of compliance), and logging actions (e.g., logging or storing the compliance level).

The system 500 may be software stored on a non-transitory computer readable medium having instructions encoded thereon that, when executed by a processing device, cause the processing device to: access a first indicator associated with a first device and access communication information associated with the first device. The first indicator indicates an elevated security risk. The instructions may further cause the processing device to determine a second device in communication with the first device based on the communication information. The communication information may include information associated with a communication from the second device to the first device. The instructions may further cause the processing device to set a second indicator associated with the second device based on information associated with the first device and store the second indicator associated with the second device.

In some embodiments, the instructions may further cause the processing device to perform a security action based on the second indicator. In various embodiments, the communication from the second device to the first device comprises an attempted communication from the second device to the first device. In some embodiments, the second indicator is determined based on communication associated with a selected protocol.

Figure 6:
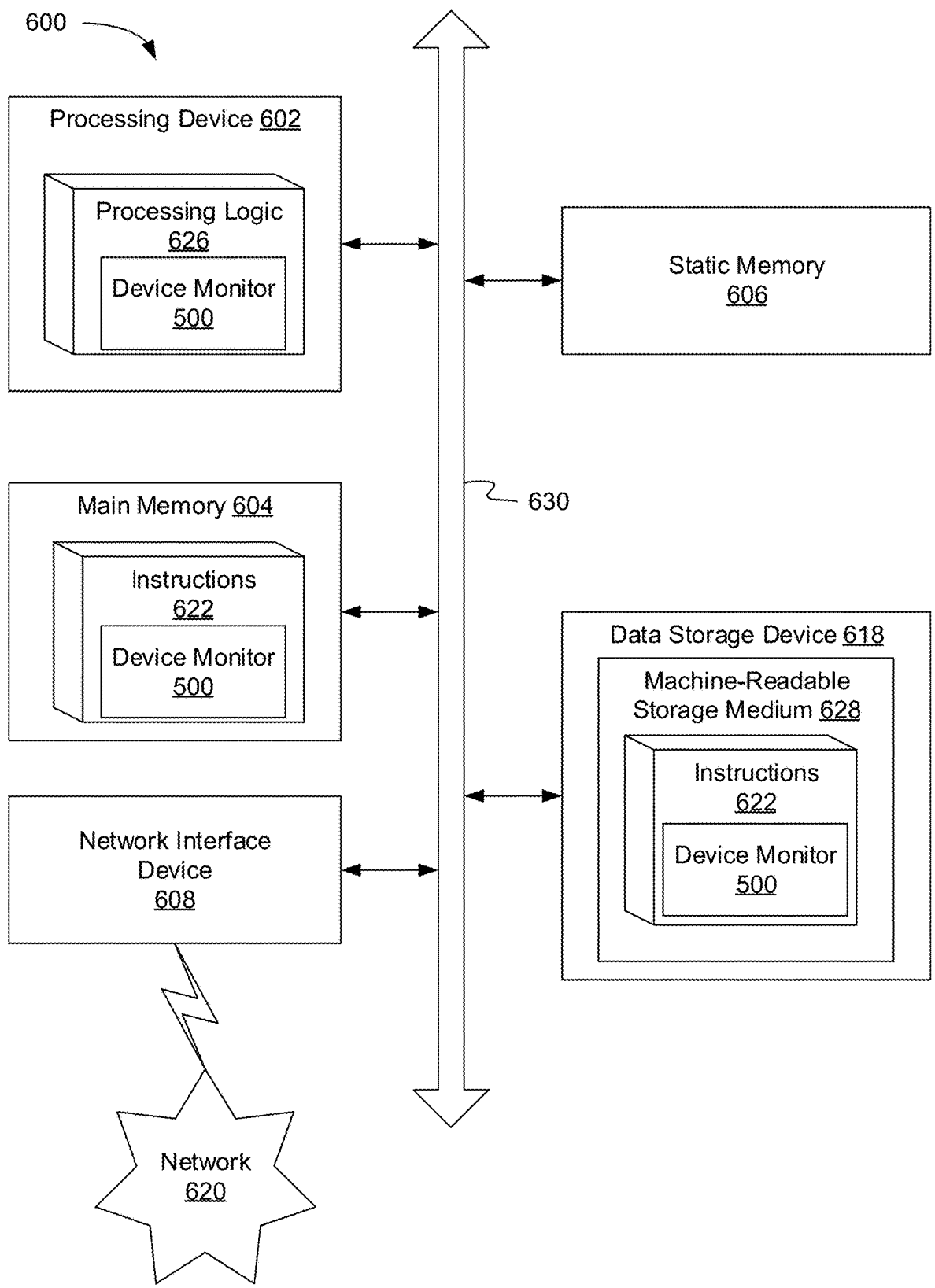
FIG. 6 is a block diagram illustrating an example computer system, in accordance with one implementation of the present disclosure.

FIG. 6 illustrates a diagrammatic representation of a machine in the example form of a computer system 600 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 600 may be representative of a server, such as network monitor device 102 configured to monitor one or more devices and determine device risk.

The exemplary computer system 600 includes a processing device 602, a main memory 604 (e.g., read-only memory (ROM), flash memory, dynamic random access memory (DRAM), a static memory 606 (e.g., flash memory, static random access memory (SRAM), etc.), and a data storage device 618, which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute processing logic 626, which may be one example of system 500 shown in FIG. 5, for performing the operations and steps discussed herein.

The data storage device 618 may include a machine-readable storage medium 628, on which is stored one or more set of instructions 622 (e.g., software) embodying any one or more of the methodologies of functions described herein, including instructions to cause the processing device 602 to execute device monitor 500. The instructions 622 may also reside, completely or at least partially, within the main memory 604 or within the processing device 602 during execution thereof by the computer system 600; the main memory 604 and the processing device 602 also constituting machine-readable storage media. The instructions 622 may further be transmitted or received over a network 620 via the network interface device 608.

The machine-readable storage medium 628 may also be used to store instructions to perform a method for device monitoring, as described herein. While the machine-readable storage medium 628 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:
   displaying a network graph comprising a first device and a second device;
   accessing a first indicator associated with the first device, wherein the first indicator indicates a security risk level that the first device has been in communication with a risk device, wherein the security risk level is based on a number of degrees of separation of the first device from the risk device;
   accessing communication information associated with the first device;
   determining, by a processing device, the second device being in communication with the first device based on the communication information;
   setting a second indicator associated with the second device based on information associated with the first device, wherein the second indicator is set based on a bandwidth usage associated with communication between the first device and the second device; and
   storing the second indicator associated with the second device.

2. The method of claim 1 further comprising:
   performing an action on the second device based on the second indicator.

3. The method of claim 1, wherein the communication of the second device with the first device comprises a communication sent from the first device to the second device.

4. The method of claim 1, wherein the communication of the second device with the first device comprises a communication sent from the second device to the first device.

5. The method of claim 1, wherein the communication of the second device with the first device comprises an attempted communication from the first device to the second device.

6. The method of claim 1, wherein the second indicator associated with the second device indicates a medium risk level.

7. The method of claim 1 further comprising:
   displaying the second indicator associated with the second device.

8. The method of claim 1, wherein the communication of the first and second device is associated with a protocol.

9. A system comprising:
   a memory; and
   a processing device, operatively coupled to the memory, to:
   display a network graph comprising a first device and a second device;
   access a first indicator associated with the first device, wherein the first indicator indicates an elevated security risk that the first device has been in communication with a risk device;
   access communication information associated with the first device;
   determine, by a processing device, the second device being in communication with the first device based on the communication information, wherein the communication information comprises information associated with a communication from the first device to the second device;
   set a second indicator associated with the second device based on information associated with the first device, wherein the second indicator is set based on a bandwidth usage associated with communication between the first device and the second device; and
   store the second indicator associated with the second device.

10. The system of claim 9, wherein the processing device further to perform a security action based on the second indicator.

11. The system of claim 9, wherein the communication from the first device to a second device comprises an attempted communication from the first device to the second device.

12. The system of claim 9, wherein the second indicator associated with the second device indicates a medium risk level.

13. The system of claim 9, wherein the processing device further to display the first indicator associated with a first color and the second indicator associated with a second color.

14. The system of claim 9, wherein the second indicator is determined based on communication associated with a protocol.

15. A non-transitory computer readable medium having instructions encoded thereon that, when executed by a processing device, cause the processing device to:
   display a network graph comprising a first device and a second device;
   access a first indicator associated with the first device, wherein the first indicator indicates an elevated security risk that the first device has been in communication with a risk device;
   access communication information associated with the first device;
   determine, by the processing device, the second device in communication with the first device based on the communication information, wherein the communication information comprises information associated with a communication from the second device to the first device;
   set a second indicator associated with the second device based on information associated with the first device, wherein the second indicator is set based on a bandwidth usage associated with communication between the first device and the second device; and
   store the second indicator associated with the second device.

16. The non-transitory computer readable medium of claim 15, wherein the processing device further to perform a security action based on the second indicator.

17. The non-transitory computer readable medium of claim 15, wherein the communication from the second device to the first device comprises an attempted communication from the second device to the first device.

18. The non-transitory computer readable medium of claim 15, wherein the second indicator is determined based on communication associated with a selected protocol.

* * * * *